(Model.)

H. W. JOHNS.
STEAM PACKING.

No. 267,537. Patented Nov. 14, 1882.

WITNESSES

INVENTOR
Henry W. Johns,
By ......
Attorney

UNITED STATES PATENT OFFICE.

HENRY W. JOHNS, OF NEW YORK, N. Y.

STEAM-PACKING.

SPECIFICATION forming part of Letters Patent No. 267,537, dated November 14, 1882.

Application filed June 13, 1882. (Model.)

*To all whom it may concern:*

Be it known that I, HENRY W. JOHNS, a citizen of the United States, residing at New York city, in the county and State of New York, have invented new and useful Improvements in Steam-Packing, of which the following is a specification.

My invention relates to certain improvements in packing for steam-joints and similar uses, such as described in Letters Patent granted to me on the 2d day of May, 1882, No. 257,167.

The object of my present invention is to cover certain features in the process of manufacture of asbestus-rope packing and certain details of construction resulting therefrom, which are not shown or described in the Letters Patent above referred to. The advantages of asbestus-rope packing and the state of the art touching the same are fully set forth in said Letters Patent, and need not be again detailed by me at this time.

I have discovered that in the manufacture of my patented rope packing the interstices between the strands of which the rope is composed may be practically closed by subjecting the made rope to circumferential pressure, which will at the same time thoroughly condense the whole body of the rope more successfully than can be done by "longitudinal manipulation." I have also discovered that after the rope has been condensed and the surface rendered even and hard by compression it is not essentially necessary to float asbestus particles or paste to the interstices, but that a smooth finish may be given to the rope by the application of water or a size or paste of any suitable material, such as described in my Letters Patent referred to, or by the application of ordinary wax, paraffine, or equivalent bodies, not inconsistent with the uses for which the rope is intended.

Figure 1:
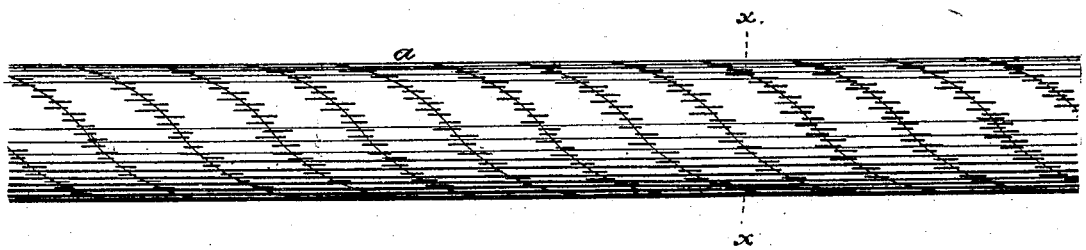
Figure 2:
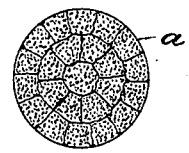

In the accompanying drawings, Figure 1 is a plan view of a piece of asbestus-rope packing embodying my invention, and Fig. 2 is a cross-section taken at the line X X of Fig. 1.

The rope is composed of a suitable number of twisted strands, *a*, of the usual construction, said strands in turn being made up of smaller strands. After the rope has been formed in any usual or well-known manner, or during the process of forming, it is subjected to external circumferential pressure, preferably by passing it between revolving rollers with suitably-shaped circumferential grooves or channels for embracing the rope, and provided with suitable adjusting mechanism for increasing or diminishing the pressure. After the rope has been pressed between such rollers or other suitable devices, the several strands are forced into substantially the shapes in cross-section shown at Fig. 2, and the interstices existing in the rope before such treatment are closed by the displacement of the fibers of asbestus, so that the surface of the rope is practically round and even. (I find that asbestus, being inelastic, retains the form into which it is compressed, and in this particular it differs from all other fibrous material.) When the rope has been brought to this condition, I then subject the surface to a coat of any suitable fluid, or a paste of any suitable material, (such as described in my before-mentioned patent, and to which reference is made for a full understanding of the same,) or I may use ordinary wax to give a smooth finish or to confine any fibers which might otherwise project. After the rope has been twisted into form and subjected to compression to give it solidity and finish I may subject it to longitudinal friction for "laying" the fibers, as described in my patent referred to, though I do not make this treatment an essential element of my present invention.

In forming rope according to my present invention I may also employ a central or core strand saturated with india-rubber, or composed of hemp, as described in my Letters Patent referred to; or I may mix with the asbestus, of which the central or surrounding strands, or both, are composed, a suitable proportion of cotton fiber, although I prefer that the strands should be composed wholly of asbestus.

I do not wish in my present case to confine myself to the details of composition or arrangement of the strands composing the rope, the gist of my invention resting in the broad idea of condensing, associating, and solidifying the strands by external circumferential pressure.

I am of course aware that the longitudinal manipulation of rope, as described in my patent, will tend to compress the strands and to some extent close the interstices without the intervention of the filling process resulting from the deposition of particles floated therein, but not in a practically successful manner, and do not in this case wish to claim anything covered by said patent; but What I now claim as new, and desire to secure by Letters Patent, is—

1. The process of making asbestus-rope packing, consisting essentially in laying the several strands in the ordinary manner, and then closing the interstices and condensing and solidifying the rope by circumferential or external pressure, substantially as hereinbefore set forth.

2. The process of making asbestus-rope packing having a smooth external finish, consisting in subjecting the formed rope to external or circumferential pressure to close the interstices and condense the strands, and then coating the exterior surface with wax or other suitable material, substantially as hereinbefore set forth.

3. As a new article of manufacture, a steam-packing composed of strands of asbestus associated or grouped together and solidified and hardened by external pressure, substantially as set forth.

4. As a new article of manufacture, a steam-packing composed of strands of asbestus associated or grouped together to form a rope, condensed and hardened by external pressure, and rendered smooth externally by the application of wax or a suitable fluid or paste, substantially as hereinbefore set forth.

In testimony whereof I have hereunto set my hand in the presence of two subscribing witnesses.

HENRY W. JOHNS.

Witnesses:
 FRANK L. CROSLEY,
 GEO. S. CURTISS.